(12) United States Patent
Ide et al.

(10) Patent No.: US 6,371,710 B1
(45) Date of Patent: Apr. 16, 2002

(54) ATTACHMENT SYSTEM

(75) Inventors: Thad Ide; P. David Halstead; Cherie F. Alexander, all of Knoxville, TN (US)

(73) Assignee: Southern Impact Research Center, LLC, Knoxville, TN (US)

( * ) Notice: Subject to any disclaimer, the term of this patent is extended or adjusted under 35 U.S.C. 154(b) by 0 days.

(21) Appl. No.: 09/654,690

(22) Filed: Sep. 5, 2000

(51) Int. Cl.$^7$ .................................................. F16B 19/00
(52) U.S. Cl. ..................... 411/508; 24/114.05; 24/114.3; 24/585; 2/411
(58) Field of Search ........................ 411/508–510, 908; 24/114.05, 114.3, 588, 580, 108, 16 PB

(56) References Cited

U.S. PATENT DOCUMENTS

| | | | | |
|---|---|---|---|---|
| 2,979,794 A | * | 4/1961 | De Bartolo | ............... 24/16 PB |
| 3,494,244 A | | 2/1970 | Wayland | |
| 4,261,243 A | | 4/1981 | Palmer | |
| 4,381,633 A | | 5/1983 | MacLeod | |
| 4,396,329 A | | 8/1983 | Wollar | |
| 4,402,641 A | | 9/1983 | Arff | |
| 4,551,189 A | | 11/1985 | Peterson | |
| 4,572,466 A | * | 2/1986 | Yamaguchi | ............... 24/16 PB |
| 4,711,002 A | * | 12/1987 | Kreeger | .................... 24/16 PB |
| 4,728,238 A | | 3/1988 | Chisholm et al. | |
| 4,762,437 A | | 8/1988 | Mitomi | |
| 4,780,035 A | * | 10/1988 | Shibayama | ................. 411/908 |
| 4,902,182 A | | 2/1990 | Lewis | |
| 4,938,645 A | | 7/1990 | Wollar | |
| 5,039,267 A | | 8/1991 | Wollar | |
| 5,306,098 A | | 4/1994 | Lewis | |
| 5,308,205 A | * | 5/1994 | Lautenschlager | ........... 411/910 |
| 5,393,185 A | * | 2/1995 | Duffy | ......................... 411/510 |
| 5,468,108 A | | 11/1995 | Sullivan et al. | |
| 5,813,810 A | | 9/1998 | Izume | |
| 5,934,729 A | * | 8/1999 | Baak | .......................... 411/510 |

* cited by examiner

Primary Examiner—Flemming Saether
(74) Attorney, Agent, or Firm—Luedeka, Neely & Graham, P.C.

(57) ABSTRACT

An attachment system including an attachment member having a height and a width with a base and a main body having a height extending away from the base and being substantially flexible along the height thereof and substantially inflexible along its width. The main body includes a plurality of substantially inflexible portions vertically spaced apart from the base and from one another by a plurality of substantially flexible connecting portions.

11 Claims, 3 Drawing Sheets

ATTACHMENT SYSTEM

FIELD OF THE INVENTION

This invention relates generally to attachment systems. More particularly, this invention relates to a system for flexibly maintaining components of sporting helmets in a desired orientation.

BACKGROUND AND SUMMARY OF THE INVENTION

There is a need in the art for improved mechanisms for attaching objects to one another and, in particular, for releasably and flexibly attaching components of athletic helmets to one another. For example, it is common to use mating hook and loop material to releasably attach fit members to shock attenuating members in athletic helmets. However, the use of hook and loop material desires improvement in that the hook and loop material does not offer desirable flex properties and has other shortcomings when used for this purpose.

Accordingly it is an object of the present invention to provide an improved system for attaching objects to one another.

Still another object of the present invention is to provide an attachment system that is suitable for use with sporting helmets.

Yet another object of the invention is to provide an attachment system of the character described that enables components of helmets to flex relative to one another while still remaining attached.

A still further object of the invention is to provide an attachment system of the character described that is economical, uncomplicated in configuration and easy to use.

With regard to the foregoing and other objects, the present invention is directed to an attachment member having a height and a width, with a base and a main body having a height extending away from the base and being substantially flexible along the height thereof and substantially inflexible along its width. The main body includes a plurality of substantially inflexible portions vertically spaced apart from the base and from one another by a plurality of substantially flexible connecting portions.

The attachment member is particularly suitable for attaching components of a sporting helmet. Thus, in another aspect, the invention relates to an attachment system for a sporting helmet.

In a preferred embodiment, the attachment system includes a shock attenuation system associated with a shell of the sporting helmet, a fit member, and an attachment member for attaching the fit member to the shock attenuation system. The attachment member includes a base, a pair of base extensions parallel to and on either side of the base, and a main body having a height extending away from the base and being substantially flexible along the height thereof. The base extensions and a bottom portion of the base opposite the main body are adhesively secured to a surface of the fit member and the main body is removably and frictionally securable within an aperture provided on a portion of the shock attenuation system.

BRIEF DESCRIPTION OF THE DRAWINGS

Further advantages of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
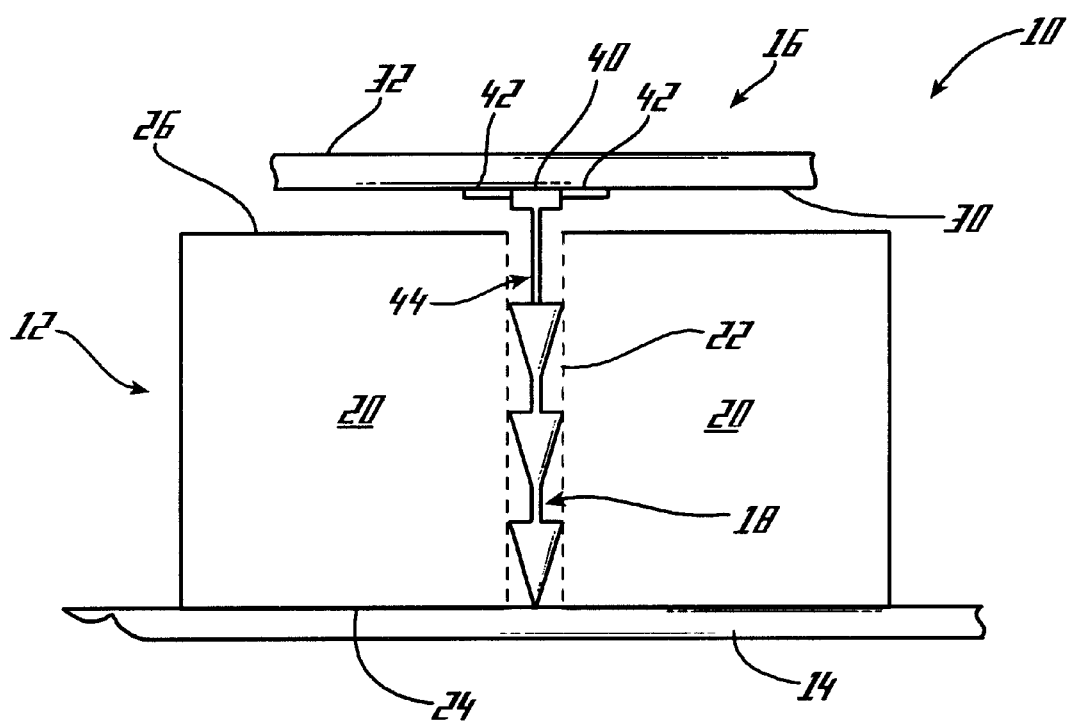
FIG. 1 is a cross-sectional side view, not to scale, showing an attachment system in accordance with a preferred embodiment of the invention.

With reference to the drawing figures, the invention relates to an attachment system 10 that is particularly suitable for use with a sporting helmet, such as a football helmet. The system 10 includes a shock attenuation system 12 associated with a sporting helmet shell 14, a fit member 16 associated with the sporting helmet, and an attachment member 18 for attaching, preferably releasably and flexibly attaching, the fit member 16 to the shock attenuation system 12.

Figure 2:
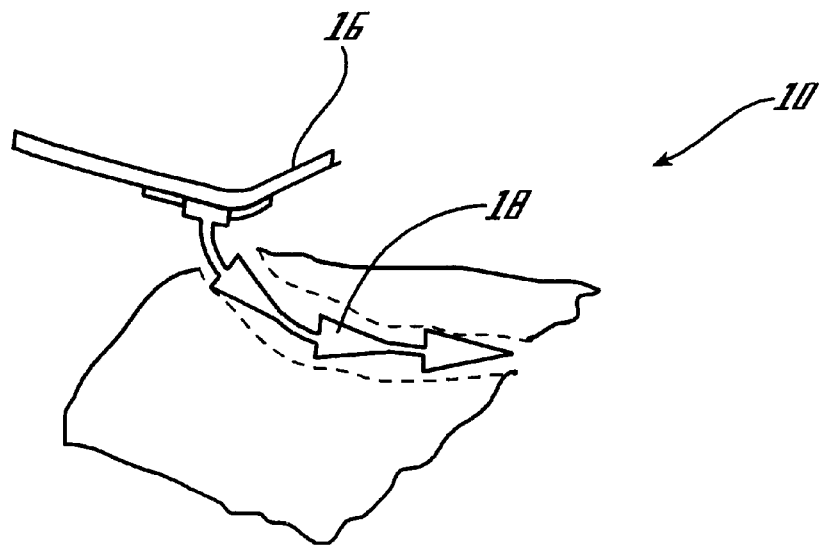
FIG. 2 is a cross-sectional view as in FIG. 1, showing flexing of an attachment system of the invention with a force applied thereto during use.

As seen in FIG. 2, the system 10 is capable of distorting in response to external forces acting thereupon, maintaining the attached relationship of the components during such distortion and thereafter returning to its undistorted orientation when the force is removed. This is particularly advantageous in the context of athletic helmets, such as football helmets, wherein external forces are frequently encountered.

The shock attenuation system 12 may be provided by a foam member 20 of the type commonly used in the manufacture of football helmets and the shell 14 may be a conventional football helmet shell. In accordance with the invention, the foam member 20 is cut or otherwise disrupted to provide an aperture or slit 22 through at least a portion thereof sized to receive the attachment member 18. The foam member 20 includes a surface 24 adjacent the shell 14 and an opposite surface 26. A preferred shock attenuation system 12 and helmet shell 14 are described in U.S. patent application Ser. No. 09/325,827, entitled Helmet and filed Jun. 4, 1999, incorporated herein by reference.

The fit member 16 may be provided by a foam member of the type commonly used in the fitting or sizing of football helmets or by a bladder member into which may be introduced a fluid such as a foam, air or water. The fit member 16 whether a foam member or a bladder member includes a surface 30 for positioning adjacent the shock attenuation system 12 and an opposite surface 32 for positioning adjacent a cranium of a user. A preferred fit member 16 is a bladder member described in U.S. patent application Ser. No. 09/326,418, entitled Helmet Fitting System and filed Jun. 4, 1999, incorporated herein by reference.

As described below, one portion of the attachment member 18 is preferably permanently affixed, as by adhesive, to a portion of the surface 32 of the fit member 16. Another portion of the attachment member 18 is frictionally securable within the slit 22 of the foam member 20 to maintain the fit member 16 in a desired relationship with respect to the foam member 20 during use. Thus, as used herein, the term "releasably" will be understood to mean that the attachment member remains attached or connected to the foam member 20 during normal use situations, but can be removed if desired.

Figure 3:
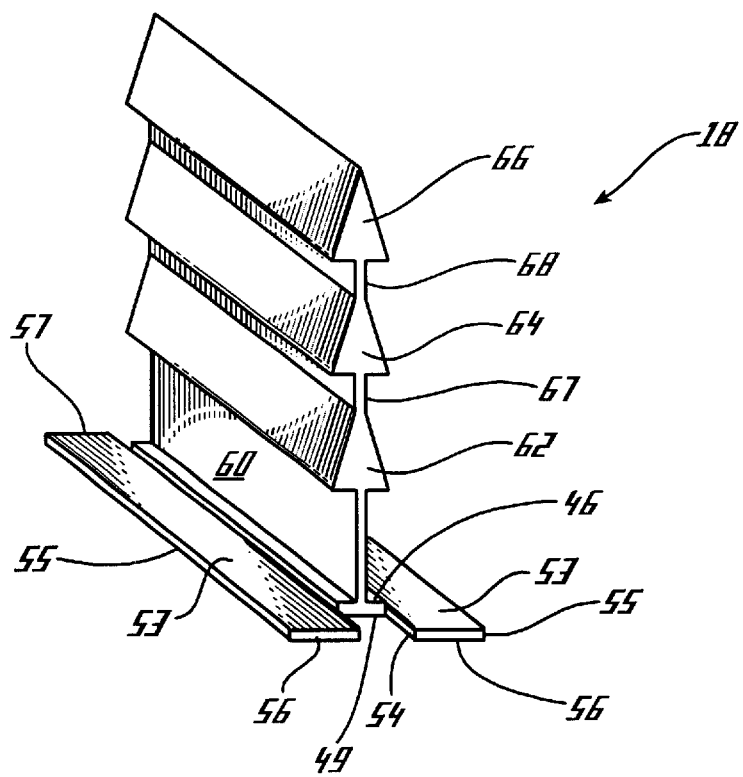
FIG. 3 is a perspective view of an attachment member for use in the attachment system of the invention.
Figure 4:
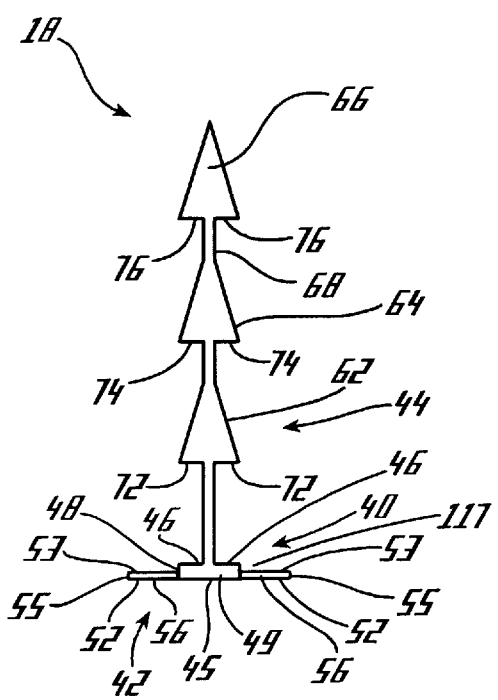
FIG. 4 is an end elevational view of the member of FIG. 3.
Figure 5:
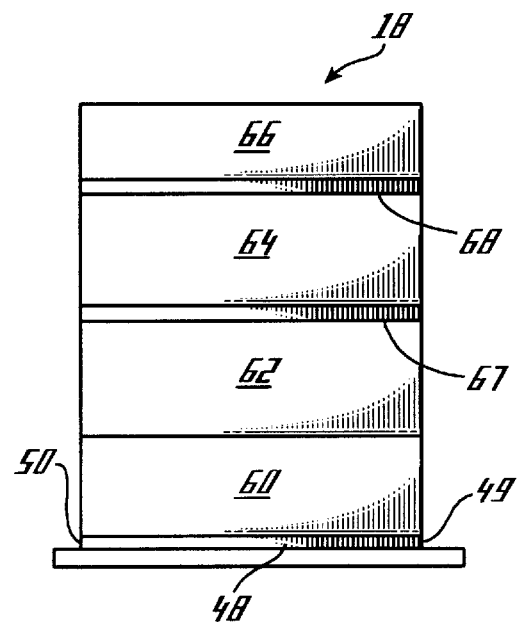
FIG. 5 is a side elevational view of the member of FIG. 3.

With reference to FIGS. 3–5, the attachment member 18 is preferably of one-piece molded polymer construction. A preferred polymer is a flexible polymer such as vinyl.

The attachment member 18 includes a substantially rectangular base 40, a pair of base extensions 42 parallel to and on either side of the base 40, and a main body 44 extending, preferably perpendicularly, away from the base 40. The dimensions described below are for the purpose of example only. The base 40 has bottom surface 45, top surface 46, edges 47, 48 and ends 49 and 50. The base 40 preferably has a length of about ⅝ inch, a width of about 3/16 inch and a thickness of about 1/16 inch.

The base extensions 42 each have a bottom surface 52, a top surface 53, inside side edge 54, outside edge 55 and ends 56 and 57. The inside edges 54 of the extensions 42 extend from the edges 47 and 48 of the base, respectively. The extensions 42 are positioned relative to the base 40 such that the bottom surfaces 52 of the base extensions 42 and the bottom surface 45 of the base are substantially coplanar and provide a substantially smooth surface for attaching, as by adhesive, to the fit member 16 or other surface to which the attachment member 18 may desirably be attached. The base extensions 42 each have a length of about ¾ inch, a width of about 3/16 inch and a thickness of about 1/64 inch.

The body 44 extends away from the top surface 46 of the base 40, preferably substantially normal thereto, and has a width dimension conforming to that of the base 40 and a length or height of about 11/16 inch. The body 44 has a variable thickness along its height and includes a main trunk portion 60, a plurality of, preferably three, triangular-shaped portions 62, 64 and 66, a connecting portion 67 connecting the top of the portion 62 to the bottom of the portion 64, and a connecting portion 68 connecting the top of the portion 64 to the bottom of the portion 66.

The main trunk portion 60 preferably has a thickness of about 1/16 inch and a height of about ¼ inch. The connecting portions 67 and 68 each preferably have a thickness of about 1/32 inch and a height of about 1/16 inch. The base of each triangular-shaped portion 62–66 has a width of about ⅛ inch. The height of each of the triangular-shaped portions 62 and 64 from its base to the connecting portion 67 or 68 is about ⅛ inch. The height of the triangular-shaped portion 66 is about 3/16 inch.

Returning to FIG. 2, the attachment member 18 is substantially flexible in a direction along its height, yet is substantially inflexible in a direction along its width. For example, the trunk portion 60 enables flexion as between the base 40 and the triangular-shaped portion 62, the connecting member 67 enables substantial flexion as between the triangular-shaped portions 62 and 64, and the connecting member 68 enables substantial flexion as between the triangular-shaped portions 64 and 66.

The extensions 42 also contribute to the overall flexibility of the system 10 in that they are relatively thin and do not inhibit flexing of the surface, such as the surface 30, to which they are adhered. Thus, the width of the extensions 42 contribute substantial surface area for adhesive securement of the member 18 to the surface 30. Because the extensions 42 are relatively thin and flexible, the extensions 42 do not substantially reduce whatever flexibility the surface 30 may have.

As will be appreciated, the triangular-shaped portions 62, 64 and 66 are relatively inflexible themselves, with the flex properties being primarily provided by the trunk portion 60 and the connecting members 67 and 68. The triangular-shaped portions 62–66 each include base portions 72, 74 and 76, respectively. The base portions 72, 74 and 76 serve as barbs to frictionally maintain the attachment member 18 within the slit 22.

Figure 6:
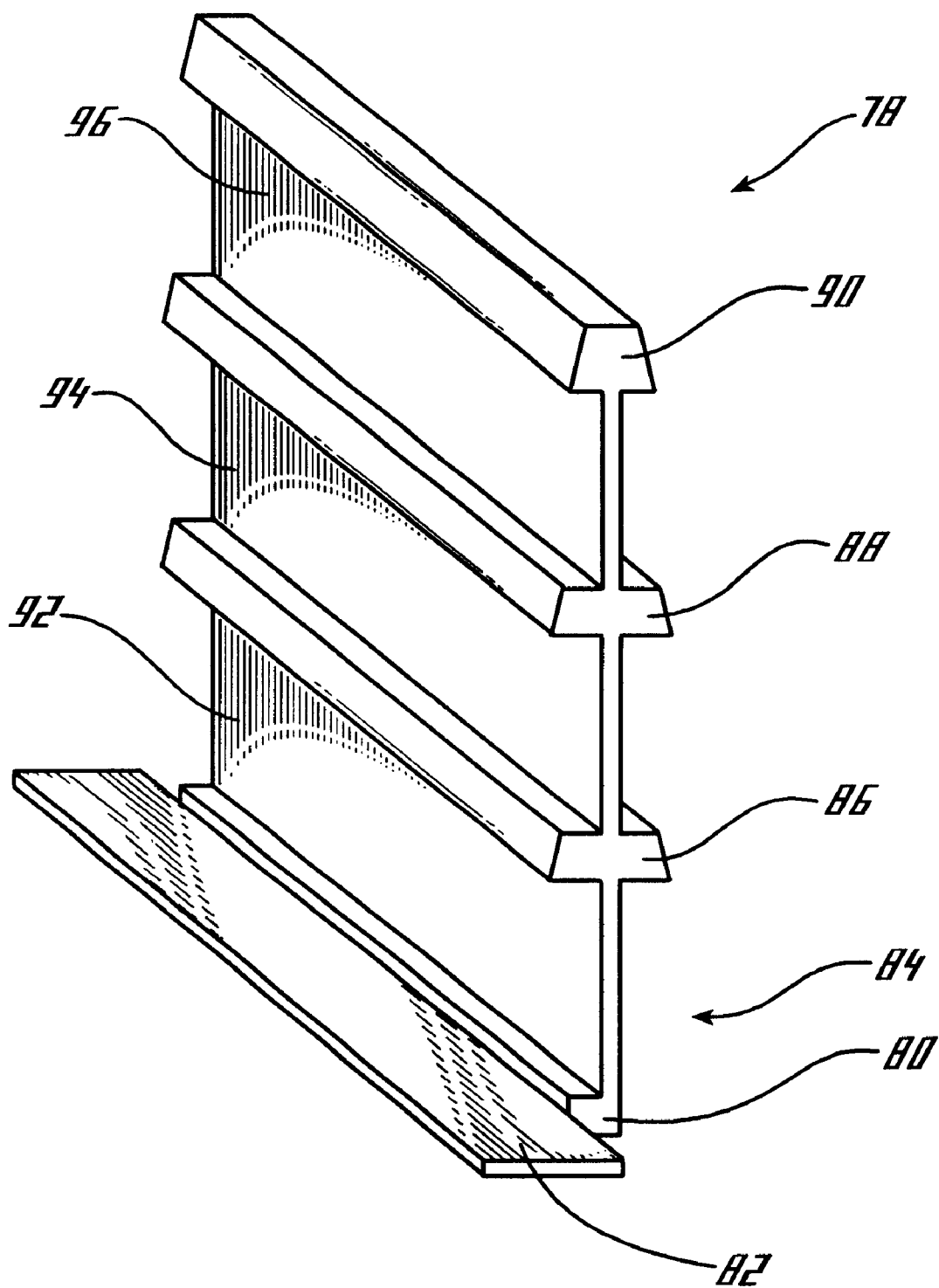
FIG. 6 is a perspective view of another embodiment of an attachment member in accordance with the invention.

Turning to FIG. 6, there is shown another embodiment of an attachment member 78. The member 78 includes a base 80, optional base extension 82 and body 84. The body 84 includes a plurality of substantially inflexible trapezoid-shaped members 86, 88 and 90 which are connected to one another by flexible connecting portions 92, 94 and 96.

Accordingly, in a preferred embodiment, it will be appreciated that the attachment member is particularly suitable for flexibly and releasably attaching a component of a football helmet, such as fit member 16, to another component, such as the foam member 20 of the shock attenuation system 12. A significant advantage of the use of the attachment member in the system 10 is that it enables the attached components, such as the foam member 20 and the fit system 16 to be maintained in relative orientation without compromising the individual flex or other properties of the component.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. An attachment system for a sporting helmet, comprising:

a shock attenuation system associated with the shell of the sporting helmet, a fit member, and an attachment member for attaching the fit member to the shock attenuation system, wherein the attachment member comprises a base, a pair of base extensions parallel to and on either side of the base, and a main body having a height extending away from the base and being substantially flexible along the height thereof, wherein the base extensions and a bottom portion of the base opposite the main body are adhesively secured to a surface of the fit member and the main body is removably and frictionally securable within an aperture provided on a portion of the shock attenuation system.

2. The attachment system of claim 1, wherein the base of the attachment member is substantially rectangular and the base extensions of the attachment member are substantially rectangular.

3. The attachment system of claim 1, wherein the base of the attachment member and the base extensions of the attachment member have substantially coplanar bottom surfaces.

4. The attachment system of claim 1, wherein the attachment member is of one-piece molded polymer construction.

5. An attachment member comprising a base having a length, a pair of base extensions parallel to and on either side of the base, and a main body having a height extending away from the base and being substantially flexible along the height thereof, the main body comprising a plurality of substantially triangular-shaped portions vertically spaced apart from the base and from one another by a plurality of substantially flexible connecting portion, each triangular-shaped portion having a length corresponding substantially to the length of the base.

6. The attachment member of claim 5, wherein the base of the attachment member and the base extensions of the attachment member have substantially coplanar bottom surfaces.

7. The attachment member of claim 5, wherein the attachment member is of one-piece molded polymer construction.

8. An attachment member having a height and a width, the attachment member comprising abase having a length, a pair of base extensions parallel to and on either side of the base, and a main body having a height extending away from the base and being substantially flexible along the height thereof and substantially inflexible along its width, the main body comprising a plurality of substantially inflexible triangular-shaped portions vertically spaced apart from the base and from one another by a plurality of substantially flexible connecting portions, each triangular-shaped portion having a length corresponding substantially to the length of the base.

9. The attachment member of claim 8, herein the base of the attachment member and the base extensions of the attachment member have substantially coplanar bottom surfaces.

10. The attachment member of claim 8, wherein the attachment member is of one-piece molded polymer construction.

11. An attachment system for a sporting helmet, comprising:

a shock attenuation system associated with the shell of the sporting helmet, a fit member, and an attachment member for attaching the fit member to the shock attenuation system, wherein the attachment member comprises a base, a pair of base extensions parallel to and on either side of the base, and a main body having a height extending away from the base and being substantially flexible along the height thereof and substantially inflexible along its width, the main body comprising a plurality of substantially inflexible triangular-shaped portions vertically spaced apart from the base and from one another by a plurality of substantially flexible connecting portions, the triangular-shaped portions being positionable within the aperture to frictionally maintain the main body therein.

* * * * *